United States Patent [19]

Schmidt-Thuemmes et al.

[11] Patent Number: 5,028,265

[45] Date of Patent: Jul. 2, 1991

[54] WAX DISPERSIONS HAVING A HIGH SOLIDS CONTENT

[75] Inventors: Juergen Schmidt-Thuemmes, Neuhofen; Gernot Koehler, Meckenheim, both of Fed. Rep. of Germany

[73] Assignee: Basf Aktiengesellschaft, Ludwigshafen, Fed. Rep. of Germany

[21] Appl. No.: 541,540

[22] Filed: Jun. 21, 1990

[30] Foreign Application Priority Data

Jul. 24, 1989 [DE] Fed. Rep. of Germany ........ 3924396

[51] Int. Cl.$^5$ .............................................. C09G 1/04
[52] U.S. Cl. ...................................... 106/271; 106/10
[58] Field of Search .................. 106/271, 10; 524/487; 252/174.23, 145

[56] References Cited

U.S. PATENT DOCUMENTS

| | | | |
|---|---|---|---|
| 4,239,546 | 12/1980 | Russell et al. | 106/10 |
| 4,246,150 | 1/1981 | Bower | 106/270 |
| 4,750,933 | 6/1988 | Brandstetter et al. | 106/10 |

FOREIGN PATENT DOCUMENTS

| | | |
|---|---|---|
| 3512564 | 9/1987 | Fed. Rep. of Germany . |
| 3420168 | 6/1988 | Fed. Rep. of Germany . |

*Primary Examiner*—Theodore Morris
*Assistant Examiner*—Mary C. DiNunzio
*Attorney, Agent, or Firm*—Oblon, Spivak, McClelland, Maier & Neustadt

[57] ABSTRACT

Aqueous dispersions of ethylene copolymer waxes, which dispersions are free-flowing at room temperature, contain a mixture of an ethylene copolymer wax having a high acid number and an ehtylene copolymer wax having a low acid number.

The novel mixtures are particularly suitable as surface preservatives, as components in floor care agents or as sizes in textile finishing.

2 Claims, No Drawings

WAX DISPERSIONS HAVING A HIGH SOLIDS CONTENT

Aqueous dispersions of carboxyl-containing waxes are suitable for a wide range of applications, for example as preservatives for surfaces of metals and of coatings, as components in floor care agents and as sizes in textile processing.

German Laid-Open Application DOS 3,512,564 describes a liquid preservative for surfaces of metals and coatings, in the form of an aqueous dispersion of an ethylene/acrylic acid copolymer wax, consisting of from 8 to 25% by weight of acrylic acid and from 92 to 75% by weight of ethylene, from 50 to 100 mol % of the carboxyl groups being neutralized. The dispersions can be prepared without the addition of an emulsifier and contain from 10 to 30% by weight of the ethylene/acrylic acid copolymer wax.

German Laid-Open Application DOS 3,420,168 describes floor care emulsions obtained from a secondary dispersion of a carboxyl-containing ethylene copolymer wax, consisting of from 10 to 25% by weight of an α-olefinically unsaturated mono- or dicarboxylic acid of 3 to 8 carbon atoms, and an aqueous primary dispersion. The secondary wax dispersion contains from 15 to 27% of the neutralized, carboxyl-containing ethylene copolymer wax.

Both systems described have the disadvantage that the dispersions possess a comparatively low solids content, i.e. not more than 27% and 30%, respectively. When an attempt is made to prepare more highly concentrated dispersions, highly viscous pastes which are not free-flowing and cannot be processed in practice are obtained.

It is an object of the present invention to provide aqueous dispersions of ethylene copolymer waxes which have a solids content of not less than 45% and flow which is sufficient for practical applications, i.e. dynamic viscosities of not more than 5000 mPa.s at room temperature.

We have found that this object is achieved if mixtures of ethylene copolymer waxes having a high acid number with ethylene copolymer waxes having a low acid number are prepared.

The novel mixtures have, as a rule, solids contents of from 45 to 55% and the components possess acid numbers of about 160–240 and 40–120, respectively.

In a preferred embodiment of the invention, the dispersed wax is a mixture of from 20 to 30 parts by weight of an ethylene copolymer wax having a high acid number and from 70 to 80 parts by weight of an ethylene copolymer wax having a low acid number.

The ethylene copolymer waxes are prepared in a conventional manner by continuous copolymerization of ethylene with the unsaturated carboxylic acids and, if required, further unsaturated, copolymerizable compounds in the presence of a free radical initiator. The polymerization takes place at from 150° to 300° C. and under from 1000 to 3000 bar. The polymerization is carried out in a single-phase polymerization medium with the addition of not more than 25% of ethylene, the ethylene present in the supercritical state serving as a solvent for the reaction mixture and the polymer melt. The ethylenically unsaturated acids and the free radical polymerization initiator used are metered separately into the reaction mixture. The regulator required for adjusting the molecular weight can be metered in together with the comonomers or the free radical initiator.

The copolymerizable unsaturated carboxylic acids are olefinically unsaturated mono- or dicarboxylic acids of 3 to 8 carbon atoms, for example acrylic acid, methacrylic acid, crotonic acid, maleic acid, fumaric acid and itaconic acid. Among these, acrylic acid and methacrylic acid and mixtures thereof are particularly preferred.

Examples of the further copolymerizable monomers are esters of acrylic acid or methacrylic acid with a saturated monohydric aliphatic alcohol, in particular with an alcohol of 1 to 4 carbon atoms, such as methanol, ethanol, n-propanol, isopropanol, n-butanol, isobutanol, sec-butanol and tert-butanol.

These or other monomers which are well known to the skilled worker and copolymerizable with ethylene are usually used in amounts of from 0 to 10% by weight, based on the total amount of monomers.

The polymerization takes place in a single-phase polymerization medium, the ethylene present in the supercritical state serving as a solvent for the reaction mixture and the polymer melt.

By using molecular weight regulators, the molecular weight of the resulting ethylene copolymer waxes is regulated so that the ethylene copolymer wax in the acid form has a melt viscosity of not less than 1000 mm$^2$/s, measured at 120° C., as a lower limit of the molecular weight, and an MFI of not less than 1, measured at 125° C. and 325 g, as an upper limit of the molecular weight.

The regulators used are in general substances which perform this function. These include, for example, aliphatic aldehydes of 3 to 6 carbon atoms, such as propionaldehyde or n-butyraldehyde, aliphatic ketones of 3 to 6 carbon atoms, such as acetone or methyl ethyl ketone, α-olefins of 3 to 6 carbon atoms, such as propene, 1-butene or 1-pentene, or $C_3$–$C_5$-alkanes, such as propane, n-butane or n-pentane. Aliphatic aldehydes, such as propionaldehyde or n-butyraldehyde, are preferably used.

The preparation of the novel mixtures (wax dispersions) is carried out in a conventional manner in an emulsifying autoclave. A temperature of about 150° C. and a pressure of about 5 bar are required. In general, the one-pot process is employed. All components are introduced into the autoclave and brought to the required pressure and temperature in the closed system with the stirrer running at moderate speed.

By adding a neutralizing agent, some or all of the carboxyl groups of the waxes are neutralized. Suitable neutralizing agents are alkali metal hydroxides, in particular sodium hydroxide or potassium hydroxide, ammonia or an aliphatic alkylamine which is unsubstituted or substituted by one or more hydroxyl groups. Particularly suitable alkylamines are mono-, di- or trialkanolamines where the hydroxyalkyl radical is preferably of 2 to 6 carbon atoms, monoalkyldialkanolamines and dialkanolmonoalkylamines, where the alkyl radical and hydroxyalkyl radical are each of 2 to 8 carbon atoms. It is of course also possible to use mixtures of the stated bases. Specific examples of the substituted amines are diethanolamine, triethanolamine, triisopropylamine, 2-amino-2-methylpropanol, dimethylethanolamine and diethylethanolamine.

The amount of neutralizing agent is usually chosen so that from 65 to 100 mol % of the carboxyl groups of the dispersed ethylene copolymer waxes are neutralized.

As a rule, the novel wax dispersions are sufficiently stable for the majority of applications, so that the addition of emulsifiers can be dispensed with. If, in specific cases, the (shear) stability of the dispersions has to meet particularly high requirements, the stability can be increased by adding nonionic or anionic emulsifiers. Conventional emulsifiers, in particular oxo alcohol ethoxylates, ethoxylates of straight-chain or branched fatty alcohols or alkylphenol ethoxylates, are suitable for this purpose.

Because of the unavoidable adverse effects of these compounds on the films which can be produced from the novel wax dispersions (relatively high sensitivity to water, reduced transparency), emulsifiers are used only in specific cases and when absolutely essential. One of the advantages of the novel mixtures is that, despite their high solids content, they also have quite sufficient stability for most applications.

PREPARATION OF ETHYLENE COPOLYMER WAXES

Wax 1

A mixture of 293 kg/h of ethylene, 8.3 kg/h of acrylic acid and 1.62 kg/h of propionaldehyde at 91° C. is fed continuously through a 10 1 stirred autoclave kept under a pressure of 2300 bar. By continuously feeding in 197.6 g/h of tert-butyl perpivalate in isododecane as a solvent, the temperature in the autoclave reactor is kept at 219° C. After the reaction mixture has been let down, the polymer is obtained in an amount of 39 kg/h, corresponding to a conversion of 13.3%, based on the ethylene throughput. It contains 19.0% by weight of acrylic acid (acid number 148) and has an MFI (125° C./0.325 kg) of 40 g/10 min.

Waxes 2-5 were prepared similarly to wax 1 by varying the amounts of acrylic acid, propionaldehyde and initiator while keeping the ethylene throughput constant:

| Wax | AA (kg/h) | PA (kg/h) | I (g/h) |
|---|---|---|---|
| 2 | 14.3 | 1.45 | 305.3 |
| 3 | 6.0 | 1.55 | 150.7 |
| 4 | 11.6 | 1.79 | 170.2 |
| 5 | 4.4 | 0.95 | 105.9 |

The characteristic values of these waxes are summarized in Table 1:

TABLE 1

| Ethylene copolymer waxes | | |
|---|---|---|
| MFI (126° C./0.325 kg) g/10 min | AA content % | Acid number mg KOH/g substance |
| Wax 1    40 | 19.0 | 148 |
| Wax 2    15 | 29.7 | 231 |
| Wax 3    52 | 14.6 | 114 |
| Wax 4    35 | 25.2 | 196 |

TABLE 1-continued

| Ethylene copolymer waxes | | |
|---|---|---|
| MFI (126° C./0.325 kg) g/10 min | AA content % | Acid number mg KOH/g substance |
| Wax 5    11 | 11.5 | 89 |

PREPARATION OF WAX DISPERSIONS

EXAMPLE 1 according to the invention

In a stirred kettle, 45 parts of wax 2, 105 parts of wax 3, 24 parts of 25% strength aqueous ammonia solution and 138 parts of water are heated, while stirring, under 4-6 bar gage pressure and at 140°-160° C. until, after about one hour, a uniform emulsion has formed. Cooling the emulsion gives a viscous but free-flowing dispersion which has a solids content of 50%, a pH of 9 and a dynamic viscosity of 1500 mPa.s.

EXAMPLE 2 according to the invention

In a stirred autoclave, 34.5 parts of wax 4 and 115.5 parts of wax 5, 19 parts of 25% strength aqueous ammonia solution and 175 parts of water are heated, while stirring, under 4-6 bar gage pressure and at 140°-160° C. until, after about one hour, a uniform emulsion has formed. Cooling the emulsion gives a viscous but free-flowing dispersion which has a solids content of 45%, a pH of 9 and a dynamic viscosity of 1200 mPa.s.

EXAMPLE 3 not according to the invention

In a stirred kettle, 50 parts of wax 1, 24 parts of 25% strength aqueous ammonia solution and 138 parts of water are heated, while stirring, under 4-6 bar gage pressure and at 140°-160° C. until, after about three hours, a uniform but highly viscous emulsion has formed. After cooling, the dispersion is found to have solidified to a gelatinous mass whose viscosity and pH are not measurable. It has a solids content of 50%.

EXAMPLE 4 not according to the invention

In a stirred kettle, 150 parts of wax 3, 3.19 parts of 25% strength aqueous ammonia solution and 175 parts of water are heated, while stirring, under 4-6 bar gage pressure and at 140°-160° C. until, after about three hours, a uniform but highly viscous emulsion has formed. After cooling, the dispersion is found to have solidified to a gelatinous mass whose viscosity and pH are not measurable. It has a solids content of 45%.

We claim:

1. An aqueous dispersion of ethylene copolymer waxes containing a mixture of from 20 to 30 parts by weight of an ethylene copolymer wax having an acid number of from 160 to 240 and 70 to 80 parts by weight of an ethylene copolymer wax having an acid number of from 40 to 120.

2. An aqueous dispersion of ethylene copolymer waxes as claimed in claim 5, having a solids content of not less than 45%.

* * * * *